No. 878,656. PATENTED FEB. 11, 1908.
J. T. MISHLER.
TROLLEY WHEEL.
APPLICATION FILED AUG. 10, 1907.
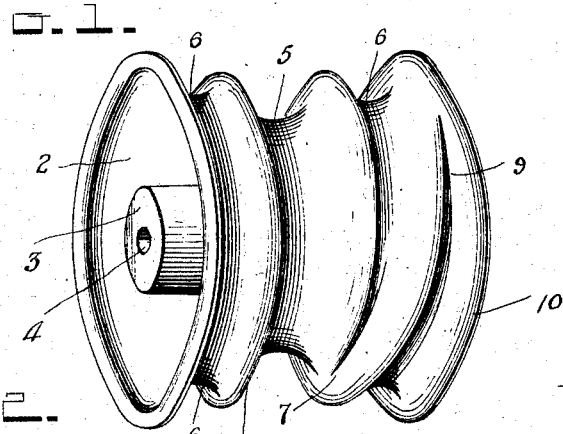
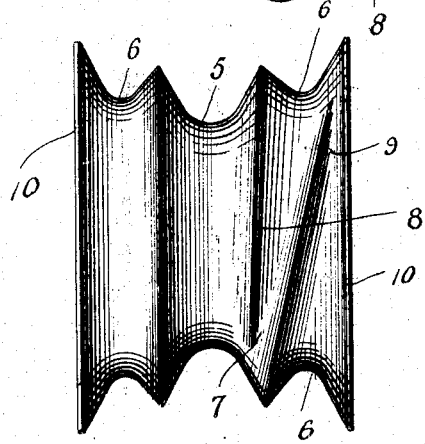
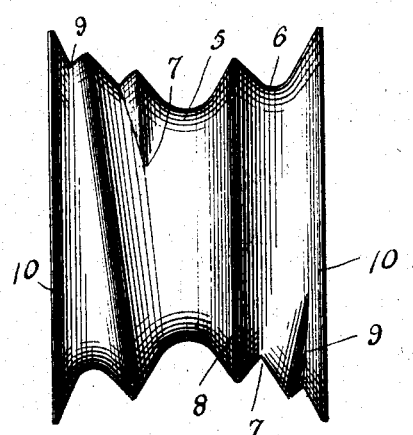
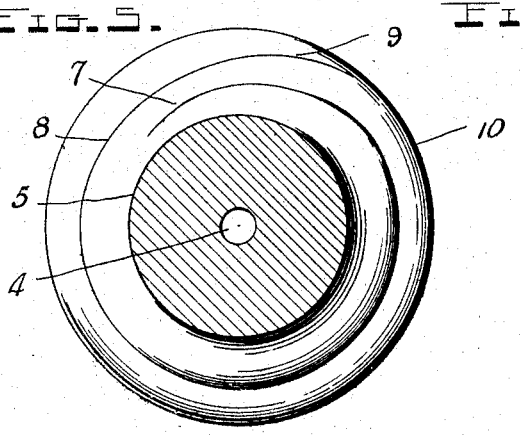
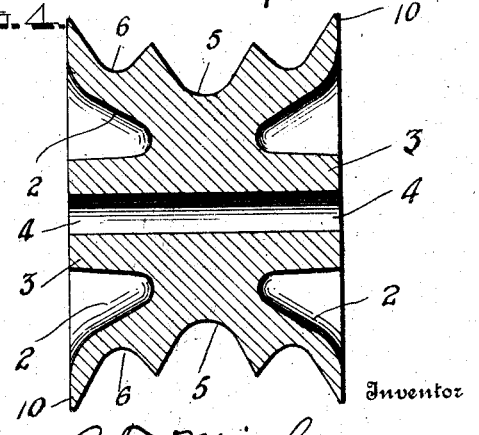
Witnesses
Chas. L. Griesbauer.
E. Rousseau.
Inventor
J. T. Mishler
By Watson E. Coleman
Attorney

UNITED STATES PATENT OFFICE.

JOSEPH T. MISHLER, OF JOHNSTOWN, PENNSYLVANIA.

TROLLEY-WHEEL.

No. 878,656.

Specification of Letters Patent.

Patented Feb. 11, 1908.

Application filed August 10, 1907. Serial No. 388,038.

*To all whom it may concern:*

Be it known that I, JOSEPH T. MISHLER, a citizen of the United States, residing at Johnstown, in the county of Cambria and State of Pennsylvania, have invented certain new and useful Improvements in Trolley-Wheels, of which the following is a specification, reference being had to the accompanying drawings.

My invention relates to improvements in trolley wheels of that class having means for replacing the trolley wire in the trolley wire groove, and it consists in the novel construction and the combination and arrangement of parts hereinafter described and claimed.

The object of the invention is to provide a wheel of this character having a central trolley wire groove and replacing grooves so arranged on the opposite sides of the central groove that the trolley wire will be quickly and effectively returned to the central one when it leaves the same and so that the trolley wire will be prevented from leaving the wheel when the car is backed.

The above and other objects are attained in the improved construction illustrated in the accompanying drawings, in which Figure 1 is a perspective view of my improved trolley wheel; Fig. 2 is a side elevation of the same; Fig. 3 is a similar view looking at the wheel in a plane at right angles to the plane of Fig. 2, and Figs. 4 and 5 are longitudinal and transverse sectional views.

My improved trolley wheel is preferably in the form of a single casting of substantially cylindrical form having at its ends annular grooves or depressions 2 concentric with hub projections 3 through which extends the bore or opening 4 for the axle or pivot of the wheel. In the periphery of the wheel is formed a centrally disposed trolley wire groove 5 which extends continuously around the body of the wheel and is comparatively deep. On each side of the central groove 5 are auxiliary or side grooves 6 which are of less depth and width than the central or main groove 5 and which extend substantially parallel therewith throughout the major portion of the circumference. The inner ends of the side or replacing grooves 6 merge into the central or main groove 5 at diametrically opposite points, as shown at 7, and the outer ends of said grooves are closed by the adjacent ends of the walls 8 between the central and side grooves, which walls merge as at 9 into the rims 10 of the wheel. These rims 10 are continuous and are of greater diameter than the walls or ribs 8 so that there will be no danger of the trolley wire leaving the wheel when the car is moved either in a forward or rearward direction.

From the foregoing it will be seen that owing to the shape and arrangement of the replacing grooves, there will be practically no danger of the trolley wire slipping out of the wire groove 5 when the car moves in a forward direction and that should the wire jump into either of the side grooves 6 it will be quickly replaced in the central groove owing to the merging of the grooves 6 in said groove as at 7. The projection of the rims or flanges 10 of the wheel also tend to lessen the danger of the wire leaving the wheel. When the car is backed the shape of the ends 7 of the grooves 6, will tend to run the wire into the latter but there will be little or no danger of the wire leaving the wheel owing to the provision of the rims or flanges 10, which guard the closed outer ends 9 of said grooves 6 as will be readily understood upon reference to the drawings. By casting the wheel as described it will be seen that it may be produced at a comparatively small cost, and that it will be exceedingly strong and durable and that it will be very effective in accomplishing its intended purpose.

Having thus described my invention what I claim is:

The herein described trolley wheel formed with a central bore and recessed ends and having in its periphery a deep central groove extending continuously around the body of the wheel, side grooves of less depth than the central one on opposite sides of the latter and parallel therewith throughout their major portions, the inner end of the side grooves merging into the central groove at diametrically opposite points and integral rims formed at the ends of the wheel and extending continuously around the same, said rims having their inner sides inclined inwardly and adapted to form the outer side walls of said side grooves, said rims being of greater diameter than the walls between the central and side grooves whereby the trolley wire will be prevented from leaving the wheel when the latter is run in either a forward or backward direction, said rims also being adapted to
5 close the outer ends of said side grooves and to project outwardly beyond said ends of the latter, substantially as shown and described.

In testimony whereof I hereunto affix my signature in the presence of two witnesses.

JOSEPH T. MISHLER.

Witnesses:
ISAAC J. KAUFMAN,
FRANK J. MISHLER.